US012107312B2

(12) United States Patent
Kikuda

(10) Patent No.: US 12,107,312 B2
(45) Date of Patent: Oct. 1, 2024

(54) BAND PASS FILTER AND HIGH FREQUENCY FRONT-END CIRCUIT INCLUDING SAME

(71) Applicant: Murata Manufacturing Co., Ltd., Nagaokakyo (JP)

(72) Inventor: Masayuki Kikuda, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 219 days.

(21) Appl. No.: 17/981,603

(22) Filed: Nov. 7, 2022

(65) Prior Publication Data

US 2023/0055439 A1 Feb. 23, 2023

Related U.S. Application Data

(63) Continuation of application No. PCT/JP2021/023739, filed on Jun. 23, 2021.

(30) Foreign Application Priority Data

Jul. 22, 2020 (JP) ................................ 2020-125411

(51) Int. Cl.
*H01P 1/208* (2006.01)
*H01P 1/20* (2006.01)
*H01P 1/205* (2006.01)

(52) U.S. Cl.
CPC .......... *H01P 1/2053* (2013.01); *H01P 1/2002* (2013.01); *H01P 1/2088* (2013.01)

(58) Field of Classification Search
CPC .... H01P 1/2053; H01P 1/2002; H01P 1/2088; H01P 1/20; H01P 1/201; H01P 1/207;
(Continued)

(56) References Cited

U.S. PATENT DOCUMENTS 5,608,363 A 3/1997 Cameron et al.
5,841,330 A 11/1998 Wenzel et al.
(Continued)

FOREIGN PATENT DOCUMENTS

EP 1791212 A1 5/2007
JP 86478001 A 3/1989
(Continued)

OTHER PUBLICATIONS

Office Action in JP2022-538653, mailed Jun. 13, 2023, 4 pages.
(Continued)

*Primary Examiner* — Stephen E. Jones
(74) *Attorney, Agent, or Firm* — Keating & Bennett, LLP

(57) ABSTRACT

A band pass filter includes a dielectric substrate, conductor plates, a ground via, waveguide resonators, and a trap resonator. The conductor plates are inside the dielectric substrate and opposed to each other. The ground via connects the conductor plates together. The waveguide resonators are coupled in series in a space between the conductor plates along a principal coupling path from an input terminal to an output terminal. Waveguide resonators adjacent along the principal coupling path are subjected to inductive coupling. The trap resonator couples waveguide resonators in two pairs included in the waveguide resonators as jumping over a portion of the principal coupling path, and capacitive couples the waveguide resonators included in each of the pairs.

20 Claims, 16 Drawing Sheets

(58) Field of Classification Search
CPC ........ H01P 1/208; H01P 1/2056; H01P 1/202; H01P 1/205; H01P 1/2084; H01P 1/2086; H01P 3/16; H01P 3/122; H01P 3/12; H01P 3/121; H01P 7/10; H01P 7/105
See application file for complete search history.

(56) References Cited

U.S. PATENT DOCUMENTS

| | | | |
|---|---|---|---|
| 6,275,124 | B1 | 8/2001 | Mendelsohn |
| 2007/0176712 | A1 | 8/2007 | Tomaki et al. |
| 2014/0152403 | A1 | 6/2014 | Park |
| 2019/0237838 | A1 | 8/2019 | Ashida et al. |
| 2021/0336313 | A1 | 10/2021 | Park et al. |

FOREIGN PATENT DOCUMENTS

| | | | |
|---|---|---|---|
| JP | 2000022403 | A | 1/2000 |
| JP | 2007208395 | A | 8/2007 |
| JP | 2014522182 | A | 8/2014 |
| JP | 2019036806 | A | 3/2019 |
| JP | 2019134326 | A | 8/2019 |
| KR | 1020200086219 | A | 7/2020 |
| WO | 2018012294 | A1 | 1/2018 |

OTHER PUBLICATIONS

Written Opinion in PCT/JP2021/023739, mailed Sep. 7, 2021, 3 pages.
International Search Report in PCT/JP2021/023739, mailed Sep. 7, 2021, 3 pages.

BAND PASS FILTER AND HIGH FREQUENCY FRONT-END CIRCUIT INCLUDING SAME

CROSS REFERENCE TO RELATED APPLICATIONS

This application claims the benefit of priority to Japanese Patent Application No. 2020-125411 filed on Jul. 22, 2020 and is a Continuation Application of PCT Application No. PCT/JP2021/023739 filed on Jun. 23, 2021. The entire contents of each application are hereby incorporated herein by reference.

BACKGROUND OF THE INVENTION

1. Field of the Invention

The present disclosure relates to band pass filters and high frequency front-end circuits and, more specifically, to techniques for improving characteristics in dielectric waveguide filters.

2. Description of the Related Art

International Publication No. 2018/012294 discloses a dielectric waveguide filter having a plurality of dielectric waveguide resonators. In the dielectric waveguide filter, the plurality of dielectric waveguide resonators are arranged so as to be coupled in series along a principal path where signals are propagated.

In this dielectric waveguide filter, dielectric waveguide resonators adjacent along the principal path are coupled, and a sub-path can be configured in which dielectric waveguide resonators are coupled to each other as jumping over a portion of the principal path. Note that in the description below, a coupling state such as one on the sub-path where dielectric waveguide resonators are coupled to each other as jumping over a portion of the principal path is also referred to as "cross coupling".

SUMMARY OF THE INVENTION

The dielectric waveguide filter described above functions as a band pass filter, with the plurality of dielectric waveguide resonators connected in series. In the band pass filter, in general, it is required to let signals pass with low loss in a desired pass band and efficiently attenuate signals in a non-pass band other than the pass band.

As a scheme of ensuring attenuation in a non-pass band in the dielectric waveguide filter, increasing the number of stages of dielectric waveguide resonators for use has been known. However, if the number of stages of dielectric waveguide resonators is increased, insertion loss in a pass band also increases, thereby possibly reducing signal transfer efficiency. Moreover, with the increase in the number of stages of dielectric waveguide resonators, an overall size of the device is increased. Thus, when a reduction in size of the device is demanded, a case can arise in which desired specifications cannot be achieved.

To address this problem, a scheme may be taken in which "cross coupling" as described above is provided between dielectric waveguide resonators to generate an attenuation pole on a high band side or a low band side with respect to a pass band, thereby improving attenuation characteristics in a non-pass band.

Meanwhile, in recent years, with an increase in communication standards and so forth, usable frequency bands have been increasing, and frequency bands adjacent to each other with a very narrow interval may be used. Thus, also in the band pass filter, higher attenuation characteristics are demanded in a non-pass band.

Preferred embodiments of the present invention provide improved attenuation characteristics in a non-pass band in band pass filters including dielectric waveguide resonators while reducing or preventing an increase in an overall size of the devices.

A band pass filter according to a preferred embodiment of the present invention includes a dielectric substrate, a first conductor plate, a second conductor plate, a first connection conductor, a plurality of waveguide resonators, and a trap resonator. The dielectric substrate includes a first surface and a second surface opposed to each other and side surfaces coupling an outer edge of the first surface and an outer edge of the second surface together. The first conductor plate and a second conductor plate are inside the dielectric substrate and opposed to each other. The first connection conductor connects the first conductor plate and the second conductor plate together. The plurality of waveguide resonators are coupled in series in a space between the first conductor plate and the second conductor plate along a principal coupling path from an input terminal to an output terminal. In the plurality of waveguide resonators, waveguide resonators adjacent along the principal coupling path are inductively coupled. Waveguide resonators in two pairs included in the plurality of waveguide resonators are coupled together by the trap resonator as jumping over a portion of the principal coupling path, and the trap resonator capacitively couples the waveguide resonators included in each of the pairs.

In a band pass filter according to a preferred embodiment of the present disclosure, the waveguide resonators in two pairs included in the plurality of dielectric waveguide resonators of the filter are coupled together by the trap resonator as jumping over a portion of the principal coupling path. This structure causes two or more attenuation poles to occur in a non-pass band on a low band side and/or a high band side with respect to the pass band, without increasing the number of stages of dielectric waveguide resonators along the principal coupling path. Therefore, it is possible to improve attenuation characteristics in the non-pass band in the band pass filter while reducing or preventing an increase in an overall size of the device.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
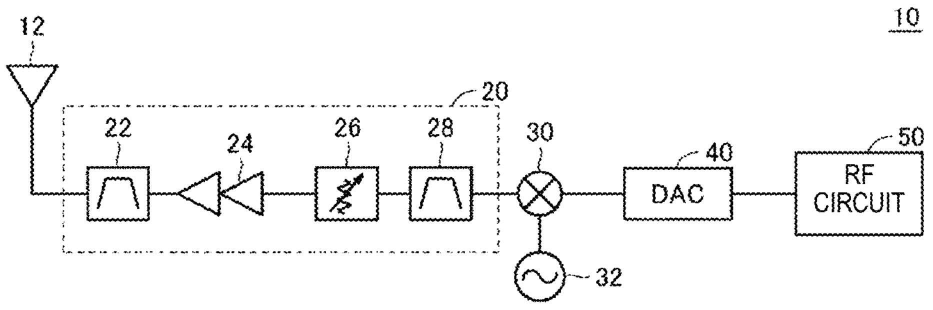
FIG. 1 is a block diagram of a communication device including a high frequency front-end circuit to which a band pass filter of Preferred Embodiment 1 of the present invention is applied.

Preferred embodiments of the present disclosure are described in detail below with reference to the drawings. Note that identical or equivalent portions in the drawings are provided with the same reference characters and their description is not repeated.

Preferred Embodiment 1

Basic Structure of Communication Device

FIG. 1 is a block diagram of a communication device 10 including a high frequency front-end circuit 20 to which a band pass filter of Preferred Embodiment 1 is applied. The communication device 10 is, for example, a cellular phone base station.

With reference to FIG. 1, the communication device 10 includes an antenna 12, the high frequency front-end circuit 20, a mixer 30, a local oscillator 32, a D/A converter (DAC) 40, and an RF circuit 50. Also, the high frequency front-end circuit 20 includes band pass filters 22 and 28, an amplifier 24, and an attenuator 26. Note that while a case is described in FIG. 1 in which the high frequency front-end circuit 20 includes a transmission circuit which transmits a high frequency signal from the antenna 12, the high frequency front-end circuit 20 may include a reception circuit which transfers a high frequency signal received at the antenna 12.

The communication device 10 up-converts a transmission signal transferred from the RF circuit 50 into a high frequency signal for emission from the antenna 12. A modified digital signal, which is the transmission signal outputted from the RF circuit 50, is converted by the D/A converter 40 into an analog signal. The mixer 30 mixes the transmission signal obtained by conversion by the D/A converter 40 from a digital signal into an analog signal with an oscillation signal from the local oscillator 32 for up-conversion into a high frequency signal. The band pass filter 28 eliminates an unwanted wave occurring by up-conversion, and extracts only a transmission signal in a desired frequency band. The attenuator 26 adjusts the strength of the transmission signal. The amplifier 24 power-amplifies the transmission signal passing through the attenuator 26 to a predetermined level. The band pass filter 22 eliminates an unwanted wave occurring in the course of amplification, and also lets only signal components in a frequency band defined by the communication standard pass therethrough. The transmission signal passing through the band pass filter 22 is emitted via the antenna 12.

As each of the band pass filters 22 and 28 in the communication device 10 as described above, a band pass filter corresponding to the present disclosure can be adopted.

Structure of Band Pass Filter

Figure 2:
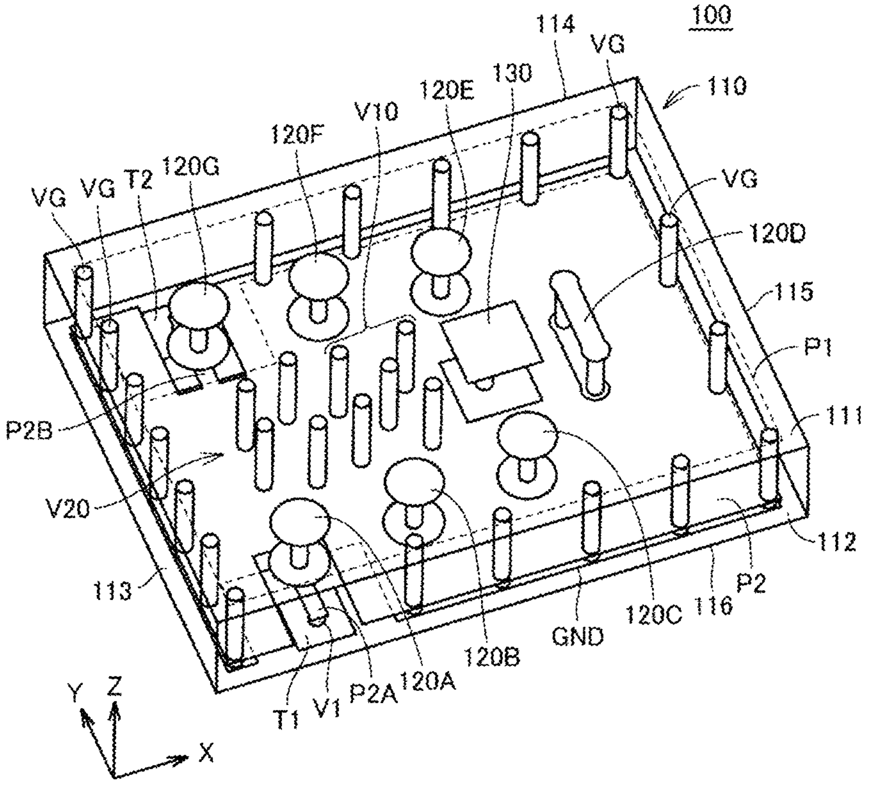
FIG. 2 is a perspective view of the band pass filter of Preferred Embodiment 1 of the present invention.
Figure 3:
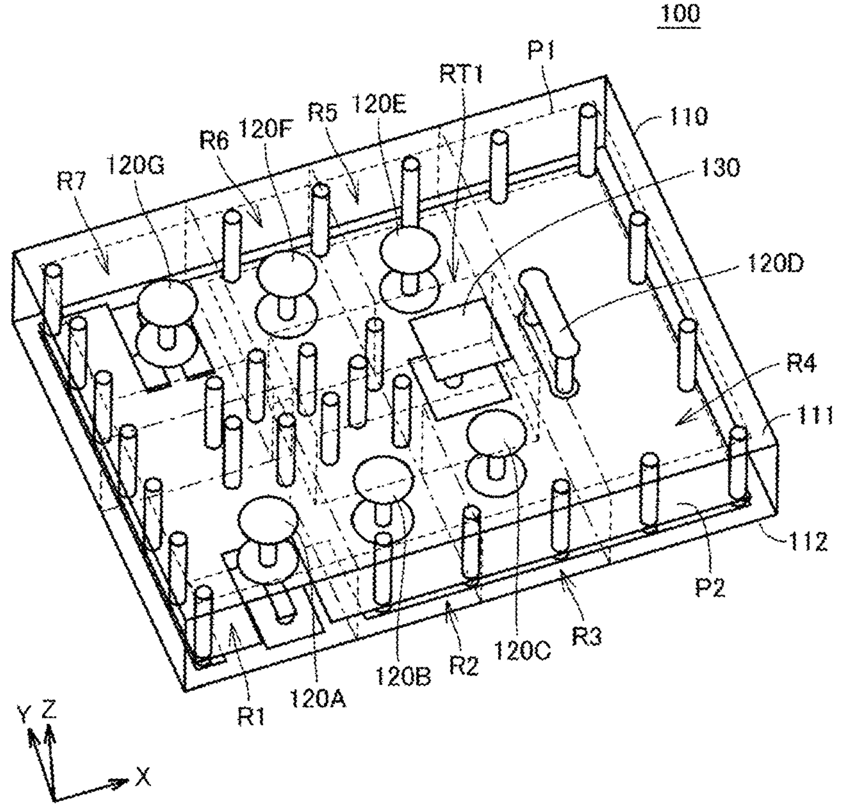
FIG. 3 is a drawing of each resonator in the band pass filter of FIG. 2.
Figure 4:
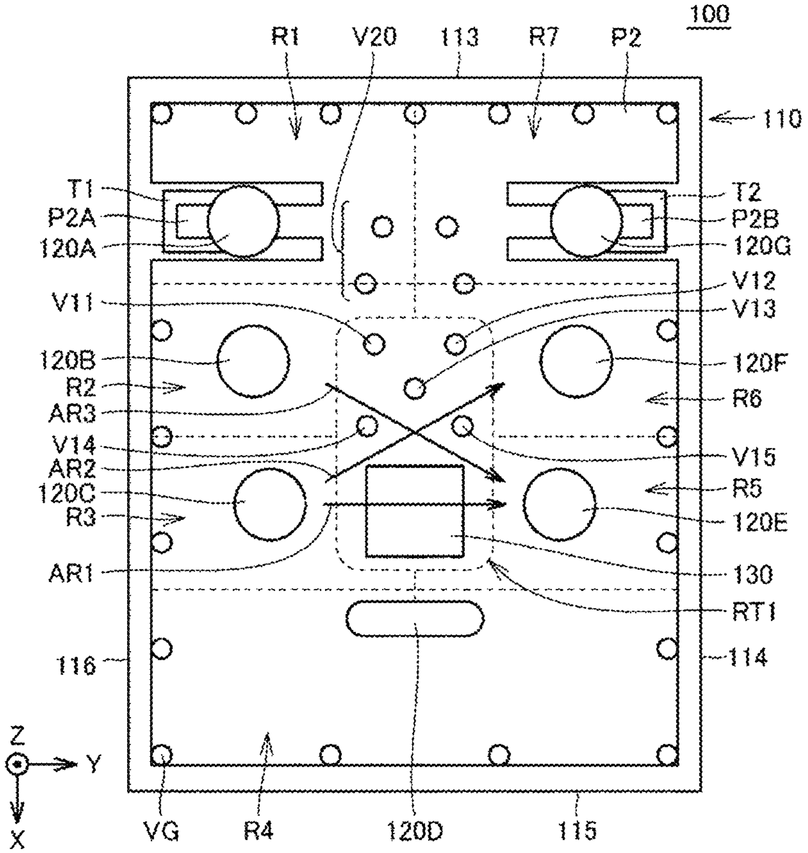
FIG. 4 is a plan view of the band pass filter of FIG. 2.

Next, by using FIG. 2 to FIG. 4, the detailed structure of a band pass filter 100 according to Preferred Embodiment 1 is described. FIG. 2 and FIG. 3 are perspective views each depicting the internal structure of the band pass filter 100 of Preferred Embodiment 1. FIG. 4 is a plan view of the band pass filter 100.

The band pass filter 100 is a dielectric waveguide filter in which a plurality of dielectric waveguide resonators are connected in series. The band pass filter 100 includes a rectangular-parallelepiped or substantially rectangular-parallelepiped dielectric substrate 110 formed by stacking a plurality of dielectric layers along a predetermined direction. In the dielectric substrate 110, a direction in which the plurality of dielectric layers are stacked is taken as a stacking direction. Each dielectric layer in the dielectric substrate 110 is formed of a dielectric ceramic such as, for example, low temperature co-fired ceramics (LTCC), or a dielectric material such as crystal or resin. Inside the dielectric substrate 110, a plurality of conductor plates and a plurality of vias configure dielectric waveguide resonators. Note that the "vias" in the specification refer to conductors provided on the dielectric substrate to connect the plurality of conductor plates and electrodes at different positions in the stacking direction. The vias are formed of, for example, conductive paste, plating, and/or metal pins.

In the description below, a stacking direction of the dielectric substrate 110 is taken as a "Z-axis direction", a direction perpendicular to the Z-axis direction and along the long side of the dielectric substrate 110 is taken as an "X-axis direction", and a direction along the short side of the dielectric substrate 110 is taken as a "Y-axis direction". Also, in the following, there may be a case in which the positive direction of the Z axis is referred to as an upper side and the negative direction thereof is referred to as a lower side in each drawing.

Note that in FIG. 2 to FIG. 4 and FIG. 9 to FIG. 11 and FIG. 14 to FIG. 20 described further below, dielectrics of the dielectric substrate 110 are omitted to depict the internal structure, and only conductors such as conductor plates, vias, and terminals provided inside are depicted.

With reference to FIG. 2 to FIG. 4, the dielectric substrate 110 has an upper surface 111 (first surface), a lower surface 112 (second surface), and side surfaces 113 to 116 coupling the outer edge of the upper surface 111 and the outer edge of the lower surface 112 together. On the lower surface 112 of the dielectric substrate 110, an input terminal T1, an output terminal T2, and a ground electrode GND are provided. Each of the input terminal T1, the output terminal T2, and the ground electrode GND has a flat-plate shape, and defines and functions as an external terminal to connect the band pass filter 100 and an external device together.

On a dielectric layer adjacent to the upper surface 111 of the dielectric substrate 110, a flat-plate-shaped conductor plate P1 having a substantially rectangular shape is provided. Note in FIG. 2 and FIG. 3 that the conductor plate P1 is indicated by a broken line to depict the internal structure.

Between the conductor plate P1 and the ground electrode GND, a flat-plate-shaped conductor plate P2 is provided on a dielectric layer adjacent to the ground electrode GND. That is, the conductor plate P1 and the conductor plate P2 are provided inside the dielectric substrate 110, and are opposed to each other in the direction of the normal (Z-axis direction) to the upper surface 111 and the lower surface 112. A partial notch is provided on each long side of the conductor plate P2 at a position adjacent to the short side on a side surface 113 side. Also, a partial notch is provided on each long side of the ground electrode GND at a position adjacent to the short side on a side surface 113 side. As depicted in FIG. 4, when viewed in plan view from the direction of the normal (Z-axis direction) of the dielectric substrate 110, the input terminal T1 and the output terminal T2 are provided at positions corresponding to the notch portion of the conductor plate P2 and the notch portion of the ground electrode GND on the lower surface 112.

On the conductor plate P2, a plate electrode P2A is provided at the notch provided on the long side of a side surface 116 side, and a plate electrode P2B is provided at the notch provided on the long side of a side surface 114 side. The plate electrodes P2A and P2B protrude in the Y-axis direction. The plate electrode P2A is connected to the input terminal T1 with a via V1. The plate electrode P2B is connected to the output terminal T2 with a via not depicted.

A plurality of ground vias VG are arranged along the side surfaces 113 to 116 of the dielectric substrate 110. The ground vias VG are columnar conductors extending in the stacking direction (Z-axis direction), and connect the conductor plates P1 and P2 and the ground electrode GND together. Also, inside the dielectric substrate 110, a plurality of vias V20 connecting the conductor plate P1 and the conductor plate P2 together are provided between the plate electrode P2A and the plate electrode P2B. A space interposed between the conductor plate P1 and the conductor plate P2, that is, a space formed by the conductor plates P1 and P2, the ground electrode GND, the ground vias VG, and the vias V20, defines a dielectric waveguide resonant space. Note that in place of the ground vias VG, flat-plate-shaped electrodes provided on the side surfaces 113 to 116 of the dielectric substrate 110 may connect the conductor plates P1 and P2 and the ground electrode GND together.

One-dot-chain lines in FIG. 3 indicate virtual boundaries indicating sections of the dielectric waveguide resonators (hereinafter also referred to as "waveguide resonators" or simply as "resonators") configured inside the dielectric substrate 110. As depicted in FIG. 3, seven resonators R1 to R7 are configured in the dielectric substrate 110. Also, a resonator RT1, which is a waveguide resonator for a trap resonator, extends across the resonator R2 and the resonator R6 and across the resonator R3 and the resonator R5.

The resonator R1 is coupled to the input terminal T1, and the resonator R7 is coupled to the output terminal T2. The resonators R1 to R4 are arranged in this sequence in the positive direction of the X axis, and the resonators R4 to R7 are arranged in this sequence in the negative direction of the X axis. Also, the resonator R1 and the resonator R7, the resonator R2 and the resonator R6, and the resonator R3 and the resonator R5 are adjacent to each other in the Y-axis direction.

That is, a path from the resonator R1 via the resonator R2, the resonator R3, the resonator R4, the resonator R5, and the resonator R6 to the resonator R7 is axisymmetrically folded with the resonator R4 defining a folding point.

Each of the resonators R1 to R7 and RT1 is a resonator using a TE101 mode as a basic mode. With the Z-axis direction in FIG. 3 taken as an electric field direction, signals are transferred in a resonant mode in which a magnetic field turns in a plane direction along an XY plane.

Figure 5A:
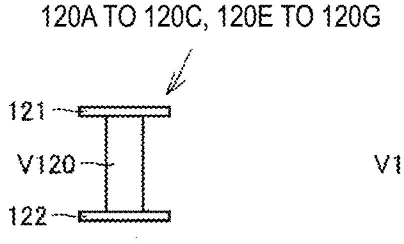
FIGS. 5A and 5B depict drawings of an inner conductor included in each resonator.
Figure 5B:
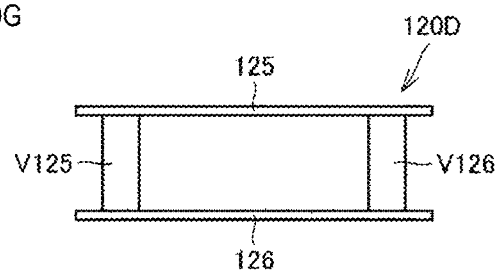

As depicted in FIG. 3, inner conductors 120A to 120G are each provided in the dielectric waveguide resonant space among the resonators R1 to R7. As depicted in FIGS. 5A and 5B, the inner conductor included in each resonator includes flat-plate-shaped wiring conductors opposed to each other and a via extending in the stacking direction of the dielectric substrate 110 and connecting the wiring conductors to each other. More specifically, the inner conductors 120A to 120C and 120E to 120G of the resonators R1 to R3 and R5 to R7 each have a structure in which wiring conductors 121 and 122 at different positions in the stacking direction are connected together with a via V120 (FIG. 5A).

Also, the inner conductor 120D of the resonator R4 (center resonator) as a folding point of the path where signals are transferred has a structure in which wiring conductors 125 and 126 at different positions in the stacking direction are connected together with two vias V125 and V126 (FIG. 5B). In other words, the inner conductor 120D has a loop shape in which the vias V125 and V126 are connected in parallel between the wiring conductor 125 and the wiring conductor 126. In this loop-shaped inner conductor, the air-core diameter of an inductor including the inner conductor is increased. Thus, the Q value can be improved when the size of the dielectric substrate 110 is the same. Alternatively, the size of the dielectric substrate 110 can be reduced while the Q value is maintained.

Note that the "wiring conductors 125 and 126" in the inner conductor 120D respectively correspond to a "first wiring conductor" and a "second wiring conductor" in the present disclosure and the "vias V125 and V126" respectively correspond to a "first columnar conductor" and a "second columnar conductor" in the present disclosure.

The inner conductors 120A to 120G as described above are not connected to any of the conductor plates P1 and P2. Thus, a local capacitive component is generated between each inner conductor and the conductor plate P1 and between each inner conductor and the conductor plate P2. In other words, the inner conductors 120A to 120G partially narrow a space of the dielectric waveguide resonant space in the resonators R1 to R7 in the electric field direction (that is, Z-axis direction).

This local capacitive component generated by the inner conductors and the conductor plates P1 and P2 allows the resonant frequency of the resonators R1 to R7 to be adjusted. Also, this local capacitive component increases the capacitive component of the dielectric waveguide resonant space. Thus, the size of the resonator for obtaining a predetermined resonant frequency can be reduced.

The trap resonator RT1 includes an inner conductor 130 and vias V10. The inner conductor 130 includes, as with the inner conductor of each of the other resonators, flat-plate-shaped wiring conductors arranged opposed to each other and a via connecting these together. The vias V10 are connected to the conductor plates P1 and P2. The inner conductor 130 and the vias V10 can adjust the resonant frequency of the trap resonator RT1. Note that while an example in which the vias V10 include five vias V11 to V15 is depicted in the example of FIG. 2 to FIG. 4, it is only required that the number of vias included in the vias V10 is at least one.

The adjacent waveguide resonators are coupled by inductive coupling or capacitive coupling. In general, it is known that coupling becomes capacitive coupling when a space in a coupling window between adjacent resonators in the electric field direction (that is, a space in the Z-axis direction) is narrowed and becomes inductive coupling when a space in the coupling window in a direction orthogonal to the electric field direction is narrowed.

In the band pass filter 100, the space of the coupling window in the electric field direction (Z-axis direction) is not narrowed between the resonator R1 and the resonator R2, between the resonator R2 and the resonator R3, between the resonator R3 and the resonator R4, between the resonator R4 and the resonator R5, between the resonator R5 and the resonator R6, and between the resonator R6 and the resonator R7. Thus, coupling is inductive coupling in any of the cases. A coupling path from the input terminal T1 via the resonator R1, the resonator R2, the resonator R3, the resonator R4, the resonator R5, the resonator R6, and the resonator R7 to the output terminal T2 is referred to as a "principal coupling path". In this case, the resonators R1 to R7 are coupled in series along the principal coupling path, and resonators adjacent along the principal coupling path are subjected to inductive coupling.

In the band pass filter 100 of Preferred Embodiment 1, as described above, the resonators R1 to R7 are axisymmetrically folded with the resonator R4 taken as a folding point and, furthermore, the resonator R1 and the resonator R7, the resonator R2 and the resonator R6, and the resonator R3 and the resonator R5 are adjacent to each other. Thus, "cross coupling", which jumps over a portion of the principal coupling path to be coupled to each other, can occur between the resonator R1 and the resonator R7, between the resonator R2 and the resonator R6, and between the resonator R3 and the resonator R5. A coupling path where this "cross coupling" occurs is also referred to as "sub-coupling path". For example, a sub-coupling path between the resonator R1 and the resonator R7 is subjected to inductive coupling because the coupling window in a width direction is narrowed by the vias V20.

The trap resonator RT1 extends across the resonator R2 and the resonator R6 and across the resonator R3 and the resonator R5. Thus, cross coupling via the trap resonator RT1 occurs between the resonator R2 and the resonator R6 and between the resonator R3 and the resonator R5. In the band pass filter 100 of Preferred Embodiment 1, the inner conductor 130 of the trap resonator RT1 extends across the resonator R3 and the resonator R5, and the vias V10 extend across the resonator R2 and the resonator R6.

A sub-coupling path between the resonator R3 and the resonator R5 is subjected to capacitive coupling because the space of the coupling window in a height direction (that is, electric field direction) is narrowed by the inner conductor 130 (arrow AR1 of FIG. 4). A sub-coupling path between the resonator R2 and the resonator R6 can be subjected to basically inductive coupling because the space of the coupling window in the width direction is narrowed by the vias V10. However, in the example of the band pass filter 100, since the vias V10 include five vias V11 to V15 and the number of vias included in the vias V10 is large, the vias V10 function as a shielding wall, and cross coupling between the resonator R2 and the resonator R6 hardly occurs.

In the band pass filter 100, by the trap resonator RT1, cross coupling can occur in the sub-coupling path between the resonator R2 and the resonator R5 and the sub-coupling path between the resonator R3 and the resonator R6. That is, in the trap resonator RT1, cross coupling occurs for two or more pairs of waveguide resonators. Since coupling via the inner conductor 130 of the trap resonator RT1 occurs in the sub-coupling path between the resonator R2 and the resonator R5 and the sub-coupling path between the resonator R3 and the resonator R6, the coupling is basically capacitive coupling (arrows AR2 and AR3 of FIG. 4). However, because of the influence from the vias V10, the degree of coupling is weaker compared with capacitive coupling between the resonator R3 and the resonator R5.

Note that the degree of coupling between resonators can be analyzed by a simulation as follows. First, a resonant frequency between two resonators as analysis targets is determined. In general, in the resonant frequency, two modes (even mode and odd mode) occur in accordance with the orientation of an occurring magnetic field.

When the resonant frequency in even mode is $F_{even}$ and the resonant frequency in odd mode is $F_{odd}$, $F_{odd}>F_{even}$ holds in general. A coefficient K of coupling between resonators is calculated by equation (1) below. Note that the sign of the coefficient of coupling is positive in inductive coupling and the sign of the coefficient of coupling is negative in capacitive coupling.

$$K=(F_{odd}-F_{even})/\{(F_{odd}+F_{even})/2\} \quad (1)$$

As the absolute value of the coefficient of coupling calculated as described above is larger, the degree of coupling between resonators is stronger.

Figure 6A:
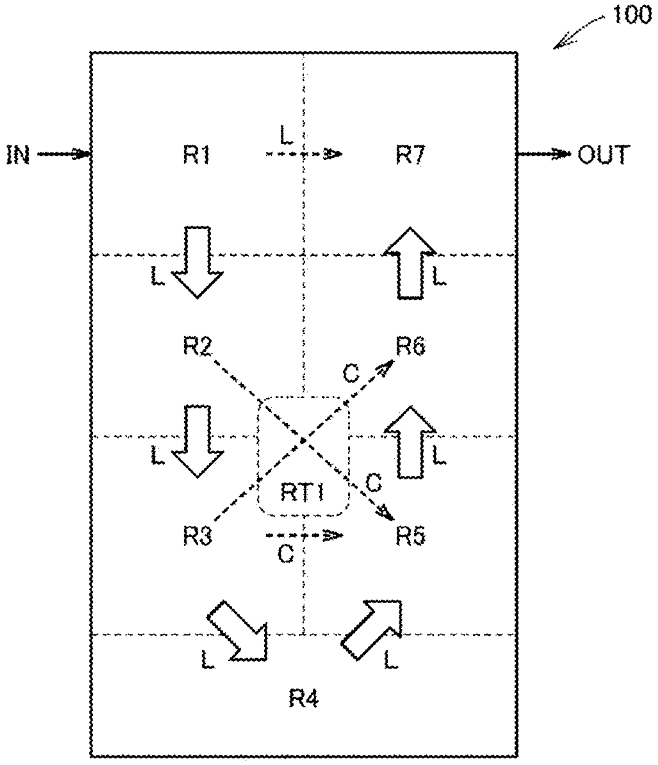
FIGS. 6A and 6B depict drawings depicting a coupling structure of respective resonators in the band pass filter of FIG. 2.
Figure 6B:
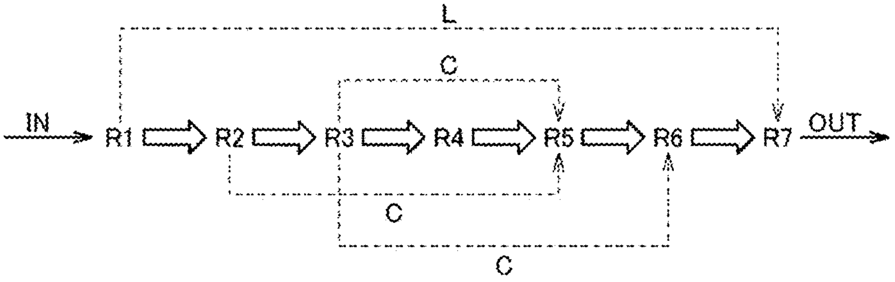

FIGS. 6A and 6B depict a coupling structure between respective resonators in the band pass filter 100. In FIGS. 6A and 6B, the principal coupling path from the resonator R1 via the resonator R4 to the resonator R7 is indicated by solid arrows, and sub-coupling paths by cross coupling are indicated by dashed arrows. In the drawings, "L" indicates inductive coupling, and "C" indicates capacitive coupling. As depicted in FIGS. 6A and 6B, in the resonator R5 and the resonator R6, the state is such that a signal transferred through the principal coupling path by inductive coupling and signals transferred through the sub-coupling paths by capacitive coupling are combined.

In general, the pass phase of a resonator has characteristics in which the phase is delayed by 90° on a low frequency side with respect to the resonant frequency of the resonator and the phase advances by 90° on a high frequency side with respect to the resonant frequency of the resonator. Also, since inductive coupling and capacitive coupling have a relation in which the phase is inverted each other, as in the resonator R5 and the resonator R6, if a signal by inductive coupling and a signal by capacitive coupling are combined, a frequency where these signals have inverted phases and the same amplitude is present. Thus, an attenuation pole occurs at this frequency.

Note that an attenuation pole tends to occur on a high frequency side with respect to the pass band when capacitive coupling is strong and an attenuation pole tends to occur on a low frequency side with respect to the pass band when capacitive coupling is weak. In the example of the band pass filter 100 of Preferred Embodiment 1, capacitive coupling between the resonator R3 and the resonator R5 is strong, and capacitive coupling between the resonator R2 and the resonator R5 and capacitive coupling between the resonator R3 and the resonator R6 are weak. Thus, one attenuation pole occurs on a high band side with respect to the pass band, and two attenuation poles occur on a low band side.

Figure 7:
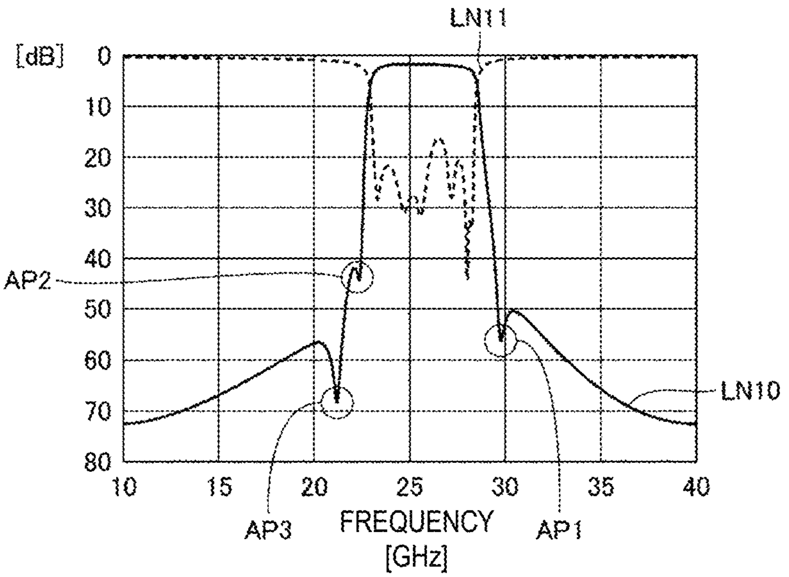
FIG. 7 is a drawing of bandpass characteristics of the band pass filter of FIG. 2.
Figure 8:
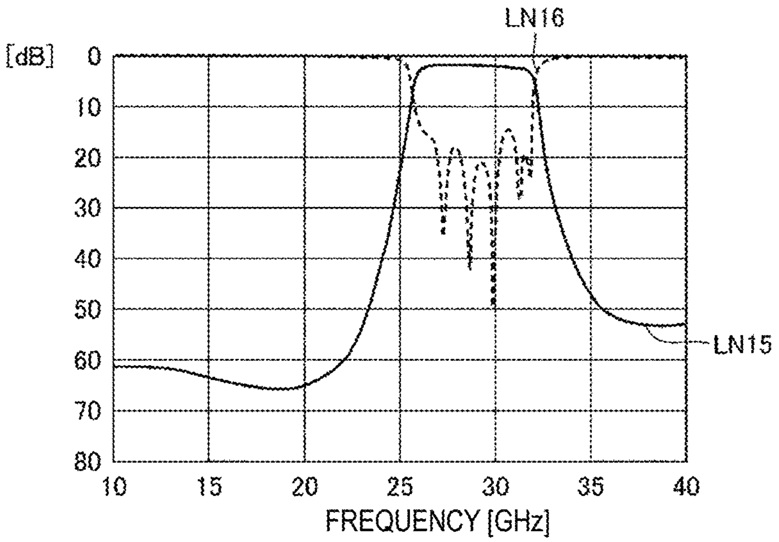
FIG. 8 is a drawing of bandpass characteristics of a band pass filter in a comparative example.

FIG. 7 is a drawing of bandpass characteristics of the band pass filter 100 of Preferred Embodiment 1. Also, in FIG. 8, as a comparative example, bandpass characteristics of a band pass filter where cross coupling does not occur are depicted. In FIG. 7 and FIG. 8, the horizontal axis represents frequency, and the vertical axis represents insertion loss (solid lines LN10 and LN15) and return loss (broken lines LN11 and LN16).

With reference to FIG. 7 and FIG. 8, in the band pass filter of the comparative example, no attenuation pole occurs on both of a high band side and a low band side with respect to the pass band. In the band pass filter 100 of Preferred Embodiment 1, however, an attenuation pole AP1 occurs on a high band side with respect to the pass band, and two attenuation poles AP2 and AP3 occur on a low band side with respect to the pass band. As described above, the attenuation pole AP1 is an attenuation pole occurring from cross coupling between the resonator R3 and the resonator R5, and the attenuation poles AP2 and AP3 are attenuation poles occurring from cross coupling between the resonator R2 and the resonator R5 and cross coupling between the resonator R3 and the resonator R6.

It can be confirmed that, with these attenuation poles, attenuation characteristics of steep and high attenuation are obtained on the high band side and the low band side with respect to the pass band in the band pass filter 100 of Preferred Embodiment 1 compared with the comparative example. In particular, in the band pass filter 100, since two attenuation poles occur on the low band side with respect to the pass band, attenuation characteristics are such that steepness is high on the low band side.

As described above, in the band pass filter using the dielectric waveguide resonators according to the present disclosure, by causing cross coupling to occur by capacitive coupling for at least two pairs of waveguide resonators by using the trap resonator, a plurality of attenuation poles occur in a non-pass band. Therefore, the number of stages of waveguide resonators along the principal coupling path is not increased. Thus, it is possible to improve attenuation characteristics in the non-pass band while reducing or preventing an increase in size of the device.

Note that while the band pass filter 100 depicted in FIG. 2 to FIG. 4 is described as an example including seven stages of waveguide resonators, the resonator R1 connected to the input terminal T1 and the resonator R7 connected to the output terminal T2 do not contribute to the occurrence of attenuation poles described above. Thus, also in a band pass filter in five-stage structure in which the input terminal T1 is connected to the resonator R2, the output terminal T2 is connected to the resonator R6, and the resonators R1 and R7 are removed, it is possible to improve attenuation characteristics in a manner similar to the above.

The "conductor plate P1" and the "conductor plate P2" in Preferred Embodiment 1 respectively correspond to a "first conductor plate" and a "second conductor plate" in the present disclosure. The "ground via VG" and the "vias V20" in Preferred Embodiment 1 correspond to a "first connection conductor" in the present disclosure. The "vias V10" in Preferred Embodiment 1 corresponds to a "second connection conductor" in the present disclosure. The "inner conductor 130" in Preferred Embodiment 1 corresponds to a "first inner conductor" in the present disclosure. The "inner conductors 120A to 120G" in Preferred Embodiment 1 each correspond to a "second inner conductor" in the present disclosure. The "resonators R2 to R6" in Preferred Embodiment 1 respectively correspond to a "first resonator" to a "fifth resonator" in the present disclosure.

Preferred Embodiment 2

In Preferred Embodiment 1, an example of structure in a case that attenuation characteristics on the low band side with respect to the pass band are improved is described.

As described above, by adjusting the degree of coupling of capacitive coupling in cross coupling, the frequency at which an attenuation pole occurs is changed. In Preferred Embodiment 2, an example of structure in a case that attenuation characteristics on the high band side with respect to the pass band are improved is described.

Figure 9:
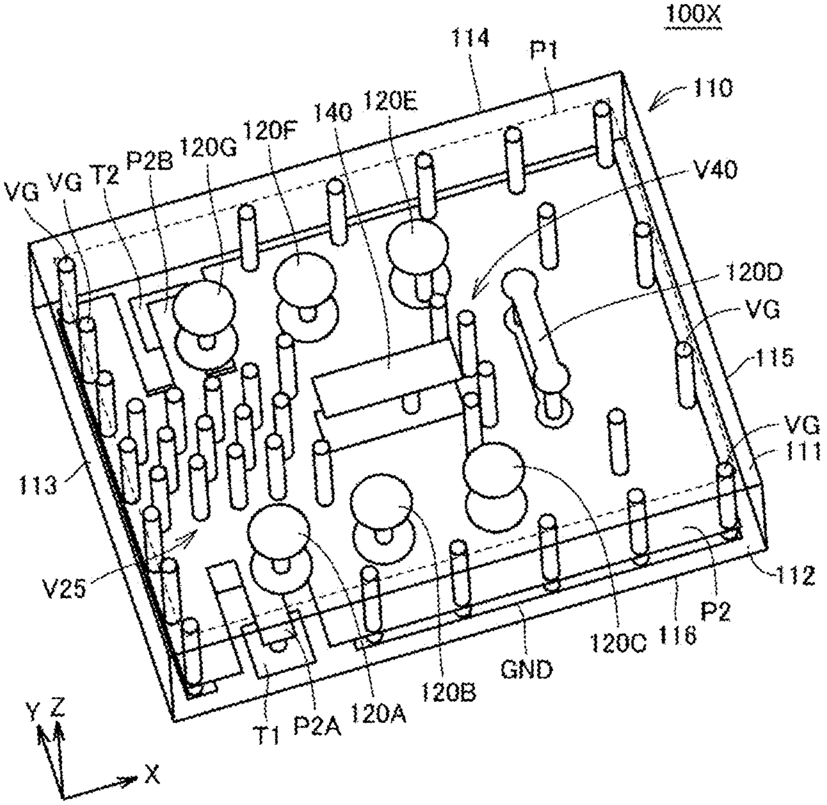
FIG. 9 is a perspective view of a band pass filter of Preferred Embodiment 2 of the present invention.
Figure 10:
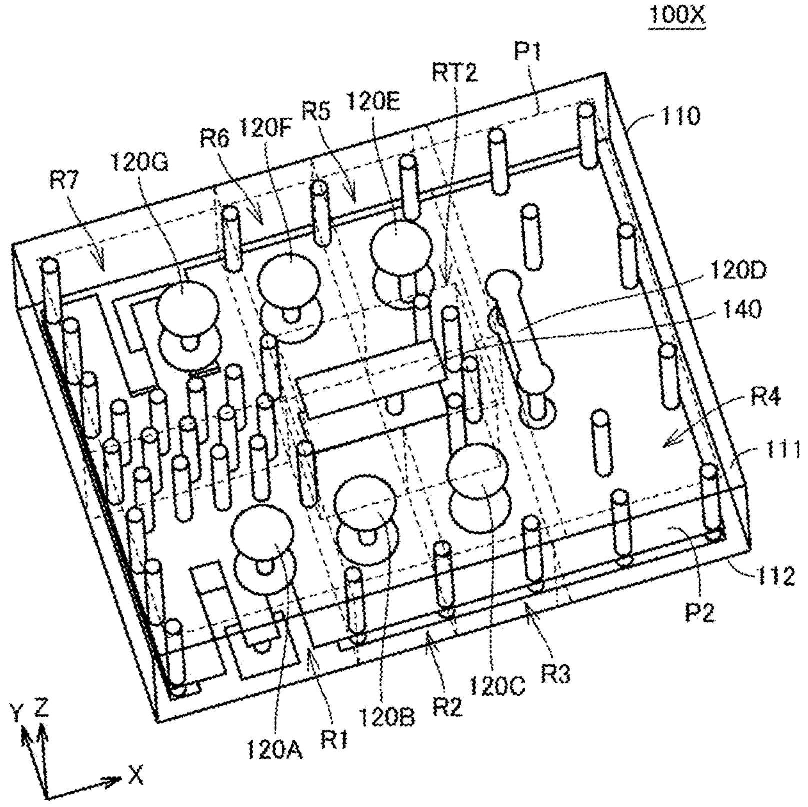
FIG. 10 is a drawing of each resonator in the band pass filter of FIG. 8.
Figure 11:
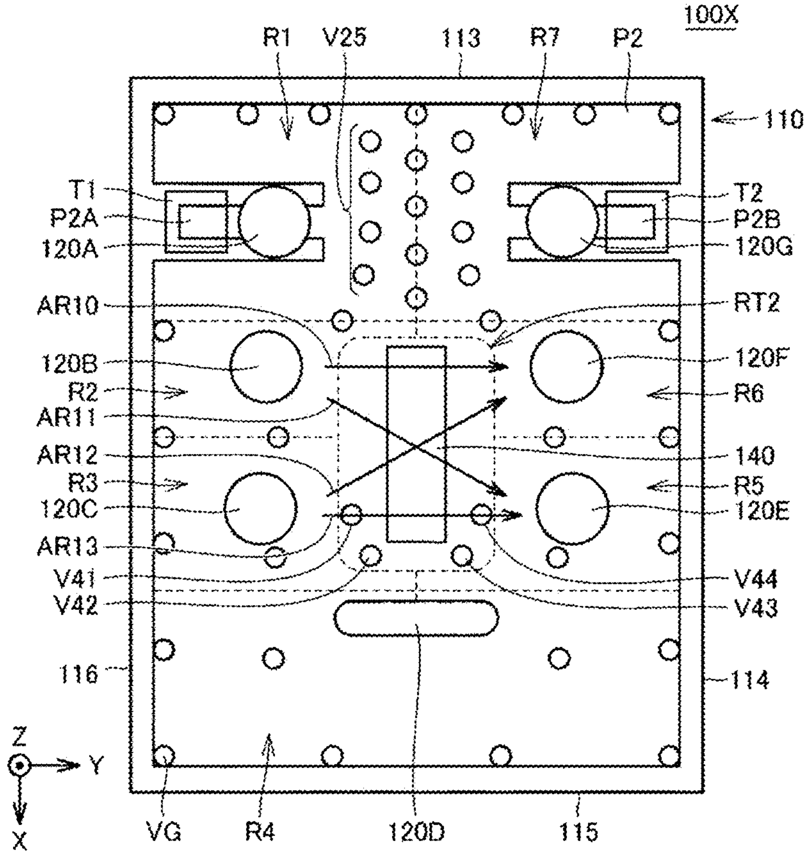
FIG. 11 is a plan view of the band pass filter of FIG. 8.

FIG. 9 and FIG. 10 are perspective views of a band pass filter 100X of Preferred Embodiment 2. FIG. 11 is a plan view of the band pass filter 100X. Note in FIG. 10 that, as with FIG. 3 of Preferred Embodiment 1, boundaries between respective resonators included in the band pass filter 100X are depicted. Also, as with the band pass filter 100 of Preferred Embodiment 1, the dielectric waveguide resonators R1 to R7 are configured on the principal coupling path from the input terminal T1 to the output terminal T2.

Also in the band pass filter 100X, a resonator RT2, which is a waveguide resonator for a trap resonator, extends across the resonator R2 and the resonator R6 and across the resonator R3 and the resonator R5. The trap resonator RT2 includes an inner conductor 140 and vias V40.

The inner conductor 140 includes, as with the inner conductor of each of the other resonators, flat-plate-shaped wiring conductors opposed to each other and a via connecting these together. The inner conductor 140 extends over an almost entire area across the resonator R2 and the resonator R6 and an about half of an area across the resonator R3 and the resonator R5. The vias V40 include vias V41 to V44, and surround an end portion of a wiring conductor of the inner conductor 140 on a resonator R4 side.

With the structure of the trap resonator RT2 as described above, cross coupling of capacitive coupling occurs in sub-coupling paths between the resonator R2 and the resonator R6, between the resonator R2 and the resonator R5, between the resonator R3 and the resonator R5, and between the resonator R3 and the resonator R6.

Also, vias V25 are provided across the resonator R1 and the resonator R7 in the band pass filter 100X. In the band pass filter 100X, since the number of vias included in the vias V25 is large, the vias V25 define and function as a shielding wall, and cross coupling between the resonator R1 and the resonator R7 hardly occurs.

Figure 12A:
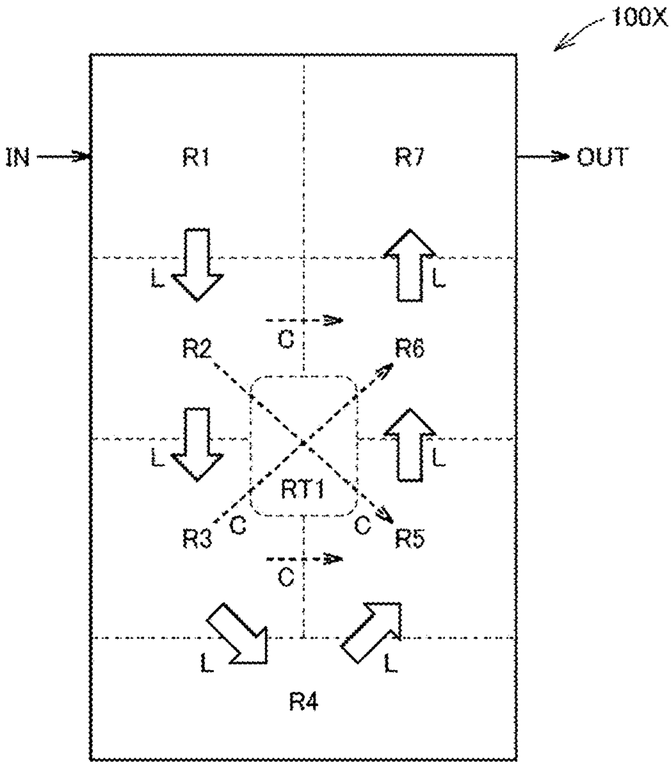
FIGS. 12A and 12B depict drawings depicting a coupling structure of respective resonators in the band pass filter of FIG. 8.
Figure 12B:
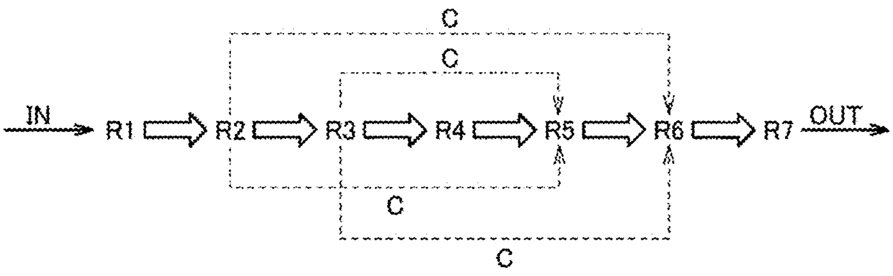

In the band pass filter 100X, as depicted in FIG. 11 and FIGS. 12A and 12B, cross coupling of relatively strong capacitive coupling occurs in sub-coupling paths between the resonator R2 and the resonator R6 (arrow AR10), between the resonator R2 and the resonator R5 (arrow AR11), and between the resonator R3 and the resonator R6 (arrow AR12). On the other hand, as for a sub-coupling path between the resonator R3 and the resonator R5 (arrow AR13), the degree of coupling of capacitive coupling is slightly weaker than other cross couplings because of the influence from the vias V40. Therefore, in the band pass filter 100X, three attenuation poles occur on the high band side with respect to the pass band, and one attenuation pole occurs on the low band side with respect to the pass band.

Figure 13:
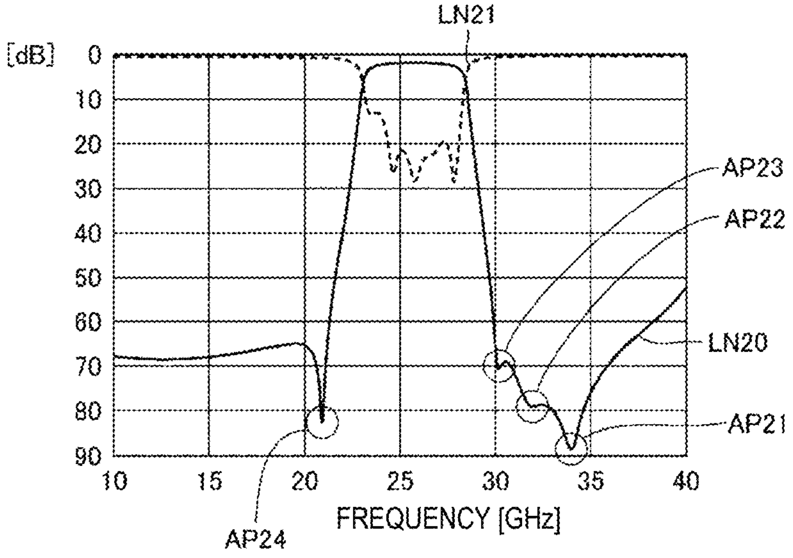
FIG. 13 is a drawing of bandpass characteristics of the band pass filter of FIG. 8.

FIG. 13 is a drawing of bandpass characteristics of the band pass filter 100X of Preferred Embodiment 2. In FIG.

13, a solid line LN20 indicates insertion loss, and a broken line LN21 indicates return loss.

With reference to FIG. 13, as described above, in the band pass filter 100X, attenuation poles AP21 to AP23 occur on the high band side with respect to the pass band by cross coupling of relatively strong capacitive coupling in sub-coupling paths between the resonator R2 and the resonator R6, between the resonator R2 and the resonator R5, and between the resonator R3 and the resonator R6. Also, an attenuation pole AP24 occurs on the low band side with respect to the pass band by cross coupling of relatively weak capacitive coupling between the resonator R3 and the resonator R5. With these attenuation poles, attenuation characteristics on the high band side and the low band side with respect to the pass band are improved, compared with the comparative example depicted in FIG. 8. In particular, with the attenuation poles AP21 to AP23 occurring on the high band side with respect to the pass band, attenuation characteristics of steeper and higher attenuation are obtained on the high band side with respect to the pass band.

Note that in the band pass filter 100X, the strength of capacitive coupling can be adjusted based on the positions of the vias of the inner conductor 140 of the trap resonator RT2. For example, if the vias are shifted to the negative direction of the X axis, capacitive coupling between the resonator R2 and the resonator R6 becomes stronger. If the vias are shifted to the positive direction of the X axis, capacitive coupling between the resonator R2 and the resonator R5 and capacitive coupling between the resonator R3 and the resonator R6 become stronger. This is because magnetic coupling between the resonator R2 and the resonator R5 and magnetic coupling between the resonator R3 and the resonator R6 are weakened by being interrupted by the via of the inner conductor 140 and, relatively, capacitive coupling is strengthened.

As has been described above, in the band pass filter of Preferred Embodiment 2, by including the trap resonator RT2 causing a plurality of cross couplings of capacitive coupling with a relatively high degree of coupling to occur, in particular, attenuation characteristics on the high band side with respect to the pass band can be improved.

Modifications

As described in Preferred Embodiment 1 and Preferred Embodiment 2 above, by changing the structure of the trap resonator, attenuation characteristics on the low band side and/or attenuation characteristics on the high band side with respect to the pass band in the band pass filter can be adjusted.

In modifications of preferred embodiments of the present invention described below, other examples of structures of trap resonators are described.

Modification 1

Figure 14:
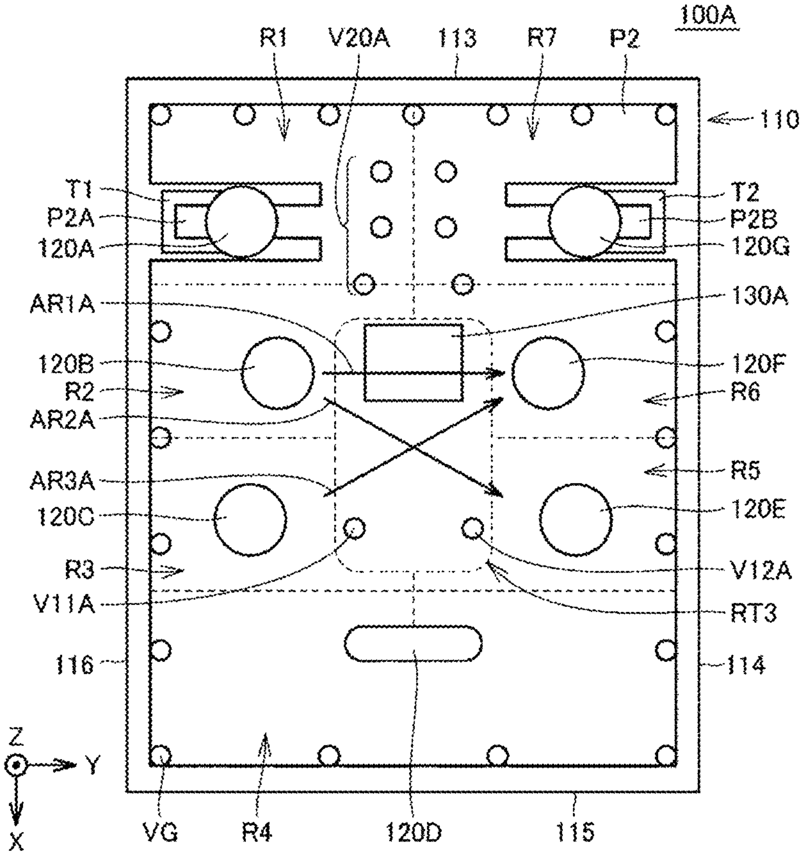
FIG. 14 is a plan view of a band pass filter of Modification 1 of a preferred embodiment of the present invention.

FIG. 14 is a plan view of a band pass filter 100A of Modification 1. In the band pass filter 100A, the structure is such that the trap resonator RT1 and the vias V20 in the band pass filter 100 of Preferred Embodiment 1 depicted in FIG. 4 are replaced by a trap resonator RT3 and vias V20A, respectively. In FIG. 14, description of components overlapping those in FIG. 4 is not repeated.

With reference to FIG. 14, the vias V20A extend across the resonator R1 and the resonator R7. Thus, cross coupling of inductive coupling can occur between the resonator R1 and the resonator R7. Note that since the number of vias included in the vias V20A is larger than the number of vias included in the vias V20 of the band pass filter 100 of FIG. 4, the degree of coupling of inductive coupling is weaker compared with the band pass filter 100.

The trap resonator RT3 includes an inner conductor 130A and vias V11A and V12A. The inner conductor 130A extends across the resonator R2 and the resonator R6. The vias V11A and V12A extend across the resonator R3 and the resonator R5 along the Y axis. With the trap resonator RT3 arranged as described above, cross coupling of relatively strong capacitive coupling occurs between the resonator R2 and the resonator R6 (arrow AR1A). Also, cross coupling of relatively weak capacitive coupling occurs in sub-coupling paths between the resonator R3 and the resonator R6 and between the resonator R2 and the resonator R5 (arrows AR2A and AR3A). Note that cross coupling of inductive coupling occurs in a sub-coupling path between the resonator R3 and the resonator R5.

Therefore, in the band pass filter 100A of Modification 1, as with the band pass filter 100 of FIG. 4, one attenuation pole occurs on the high band side with respect to the pass band, and two attenuation poles occur on the low band side.

Modification 2

Figure 15:
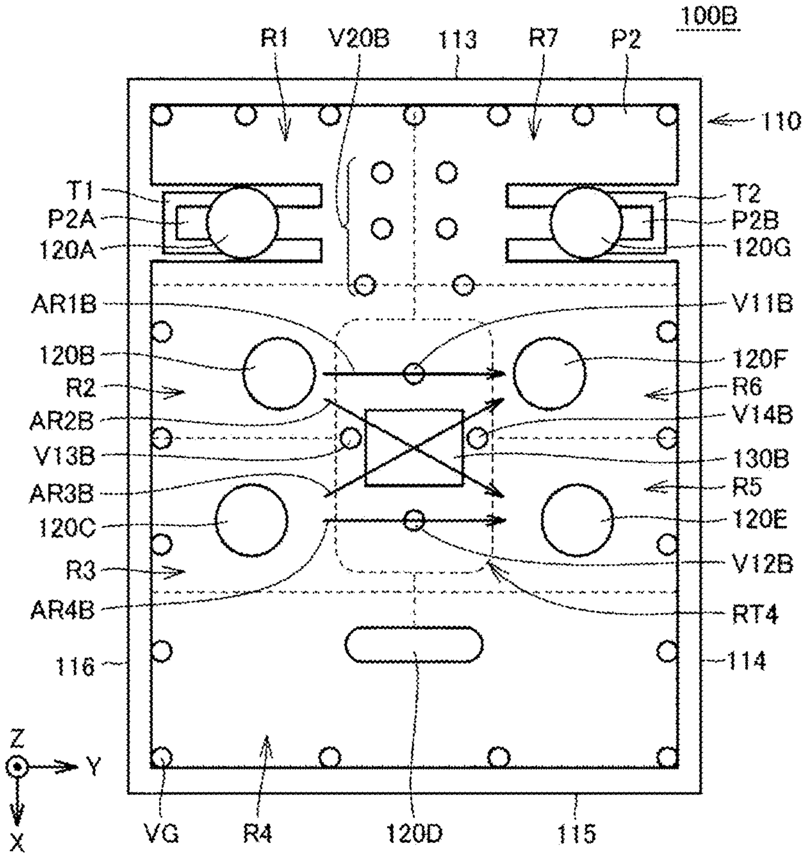
FIG. 15 is a plan view of a band pass filter of Modification 2 of a preferred embodiment of the present invention.

FIG. 15 is a plan view of a band pass filter 100B of Modification 2. In the band pass filter 100B, the structure is such that the trap resonator RT1 and the vias V20 in the band pass filter 100 of Preferred Embodiment 1 depicted in FIG. 4 are replaced by a trap resonator RT4 and vias V20B, respectively. In FIG. 15, description of components overlapping those in FIG. 4 is not repeated.

With reference to FIG. 15, the vias V20B have a structure similar to that of the vias V20A of FIG. 14, and extend across the resonator R1 and the resonator R7. This can cause cross coupling of inductive coupling to occur between the resonator R1 and the resonator R7.

The trap resonator RT4 includes an inner conductor 130B and vias V11B to V14B. The inner conductor 130B is located near a boundary of four resonators R2, R3, R5, and R6. Also, the vias V11B to V14B surround the inner conductor 130B.

More specifically, the via V11B is between the inner conductor 120B of the resonator R2 and the inner conductor 120F of the resonator R6. The via V12B is between the inner conductor 120C of the resonator R3 and the inner conductor 120E of the resonator R5. The via V13B is located near the inner conductor 130B in the negative direction of the Y axis. The via V14B is located near the inner conductor 130B in the positive direction of the Y axis.

With the inner conductor 130B and the vias V11B to V14B arranged as described above, cross coupling of relatively weak capacitive coupling occurs in sub-coupling paths between the resonator R2 and the resonator R6 (arrow AR1B), between the resonator R2 and the resonator R5 (arrow AR2B), between the resonator R3 and the resonator R6 (arrow AR3B), and between the resonator R3 and the resonator R5 (arrow AR4B).

Therefore, in the band pass filter 100B of Modification 2, four attenuation poles occur on the low band side with respect to the pass band.

Modification 3

Figure 16:
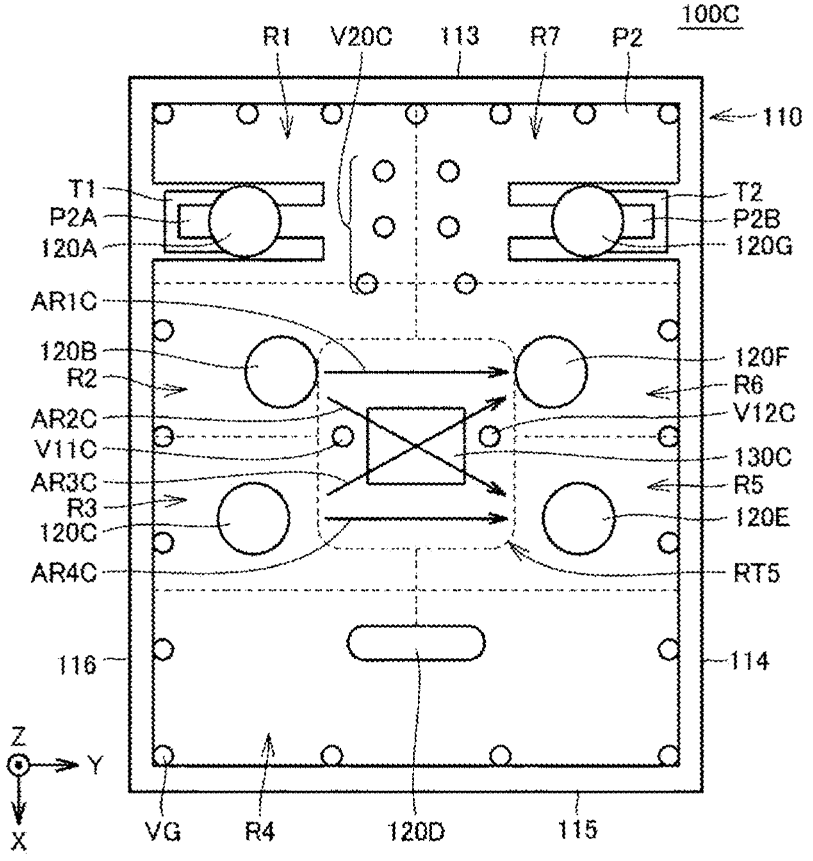
FIG. 16 is a plan view of a band pass filter of Modification 3 of a preferred embodiment of the present invention.

FIG. 16 is a plan view of a band pass filter 100C of Modification 3. In the band pass filter 100C, the structure is such that the trap resonator RT1 and the vias V20 in the band pass filter 100 of Preferred Embodiment 1 depicted in FIG. 4 are replaced by a trap resonator RT5 and vias V20C, respectively.

With reference to FIG. 16, the vias V20C have a structure similar to that of the vias V20A of FIG. 14, and extend across the resonator R1 and the resonator R7. This can cause cross coupling of inductive coupling to occur between the resonator R1 and the resonator R7.

The trap resonator RT5 includes an inner conductor 130C and vias V11C and V12C. The trap resonator RT5 has a structure corresponding to the structure of the trap resonator RT4 of the band pass filter 100B of Modification 2 depicted in FIG. 15 with the vias V11B and V12B removed therefrom.

In the band pass filter 100C, as with the band pass filter 100B of Modification 2, cross coupling of relatively weak capacitive coupling occurs in sub-coupling paths between the resonator R2 and the resonator R6 (arrow AR1C), between the resonator R2 and the resonator R5 (arrow AR2C), between the resonator R3 and the resonator R6 (arrow AR3C), and between the resonator R3 and the resonator R5 (arrow AR4C). Note that since no via is provided at positions corresponding to the vias V11B and V12B of Modification 2, each capacitive coupling of cross coupling in the band pass filter 100C is slightly stronger compared with Modification 2.

Therefore, also in the band pass filter 100C of Modification 3, four attenuation poles occur on the low band side with respect to the pass band.

Modification 4

Figure 17:
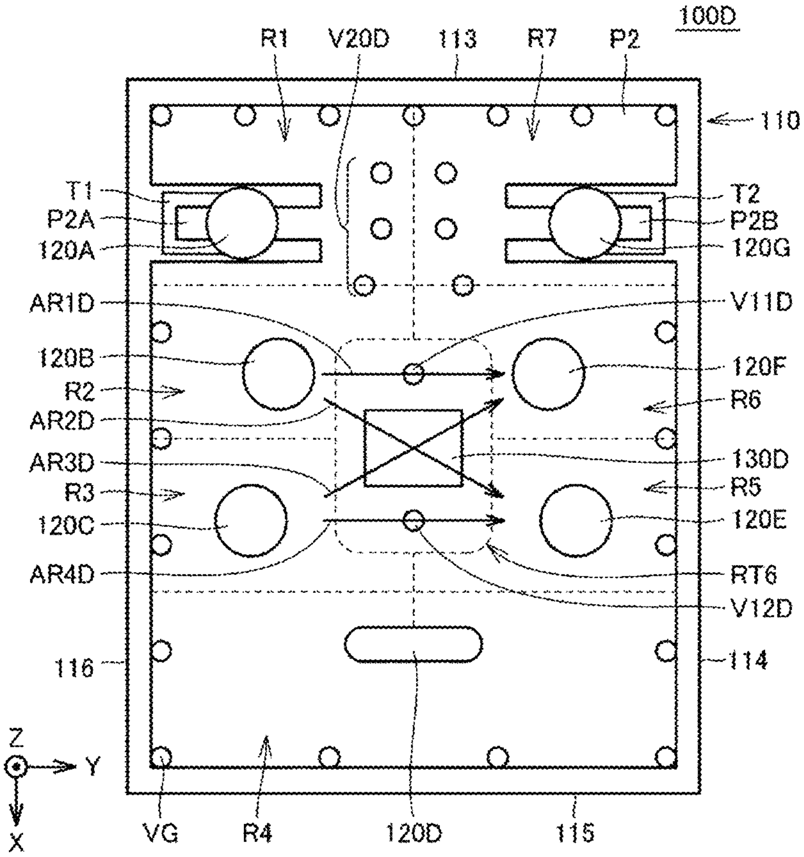
FIG. 17 is a plan view of a band pass filter of Modification 4 of a preferred embodiment of the present invention.

FIG. 17 is a plan view of a band pass filter 100D of Modification 4. In the band pass filter 100D, the structure is such that the trap resonator RT1 and the vias V20 in the band pass filter 100 of Preferred Embodiment 1 depicted in FIG. 4 are replaced by a trap resonator RT6 and vias V20D, respectively.

With reference to FIG. 17, the vias V20D have a structure similar to that of the vias V20A of FIG. 14, and extend across the resonator R1 and the resonator R7. This can cause cross coupling of inductive coupling to occur between the resonator R1 and the resonator R7.

The trap resonator RT6 includes an inner conductor 130D and vias V11D and V12D. The trap resonator RT6 has a structure corresponding to the structure of the trap resonator RT4 of the band pass filter 100B of Modification 2 depicted in FIG. 15 with the vias V13B and V14B removed therefrom.

In the band pass filter 100D, cross coupling of relatively weak capacitive coupling occurs in sub-coupling paths between the resonator R2 and the resonator R6 (arrow AR1D) and between the resonator R3 and the resonator R5 (arrow AR4D). On the other hand, cross coupling of relatively strong capacitive coupling occurs in sub-coupling paths between the resonator R2 and the resonator R5 (arrow AR2D) and between the resonator R3 and the resonator R6 (arrow AR3D).

Therefore, in the band pass filter 100D of Modification 4, two attenuation poles occur on each of the high band side and the low band side with respect to the pass band.

Modification 5

Figure 18:
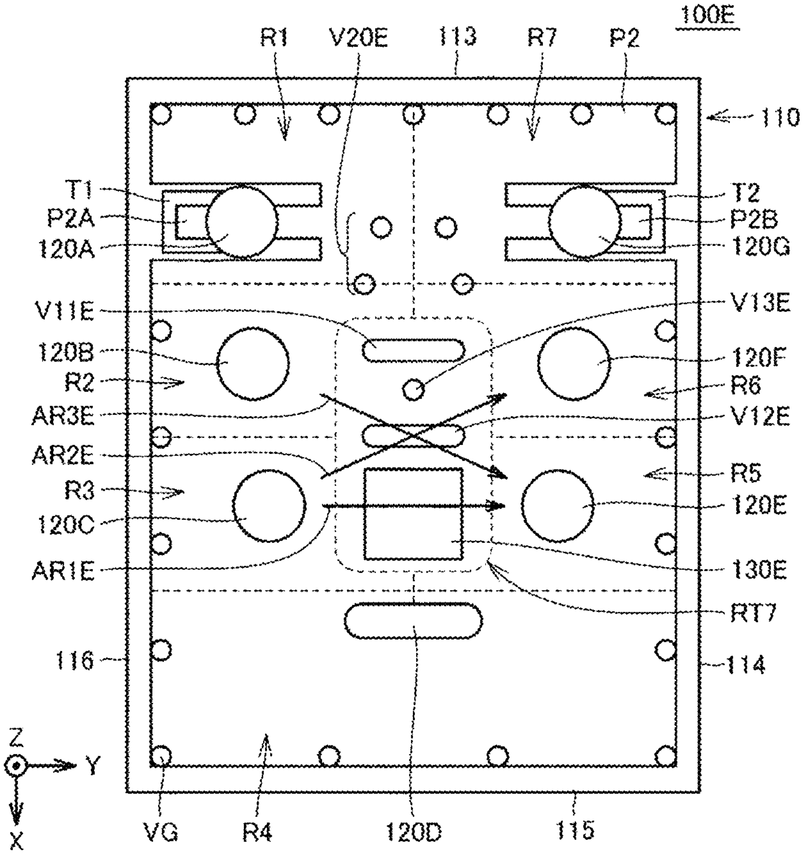
FIG. 18 is a plan view of a band pass filter of Modification 5 of a preferred embodiment of the present invention.

FIG. 18 is a plan view of a band pass filter 100E of Modification 5. In the band pass filter 100E, the structure is such that the trap resonator RT1 and the vias V20 in the band pass filter 100 of Preferred Embodiment 1 depicted in FIG. 4 are replaced by a trap resonator RT7 and vias V20E, respectively.

With reference to FIG. 17, the vias V20E have a structure similar to that of the vias V20 of Preferred Embodiment 1 in FIG. 4, and extend across the resonator R1 and the resonator R7. This can cause cross coupling of inductive coupling to occur between the resonator R1 and the resonator R7.

The trap resonator RT7 includes an inner conductor 130E and vias V11E to V13E. The trap resonator RT7 has a structure corresponding to the structure of the trap resonator RT1 of Preferred Embodiment 1 with the shape of vias therein being varied. More specifically, the via V11E is a via having a substantially oval section obtained by integrating the vias V11 and V12 in the band pass filter 100 of Preferred Embodiment 1 together. Also, the via V11E is a via having a substantially oval section obtained by integrating the vias V14 and V15 in the band pass filter 100 together. In this manner, the vias included in the trap resonator may have a shape other than a cylindrical shape.

In the band pass filter 100E, as with the band pass filter 100 of Preferred Embodiment 1, cross coupling of relatively strong capacitive coupling occurs in a sub-coupling path between the resonator R3 and the resonator R5 (arrow AR1E), and cross coupling of relative weak capacitive coupling occurs in sub-coupling paths between the resonator R2 and the resonator R5 (arrow AR2E) and between the resonator R3 and the resonator R6 (arrow AR3E). Note that since the via V12E has a substantially oval section, the degree of coupling of capacitive coupling between the resonator R2 and the resonator R5 and between the resonator R3 and the resonator R6 is further weaker compared with Preferred Embodiment 1.

Therefore, in the band pass filter 100E of Modification 5, one attenuation pole occurs on the high band side with respect to the pass band, and two attenuation poles occur on the low band side.

Modification 6

In Preferred Embodiments 1 and 2 and Modifications 1 to 5 described above, an example of structure is described in which the trap resonator extends across the resonators R2, R3, R5, and R6. In Modification 6 and Modification 7 described below, a structure is described in which the trap resonator extends across the resonators R1, R2, R6, and R7.

Figure 19:
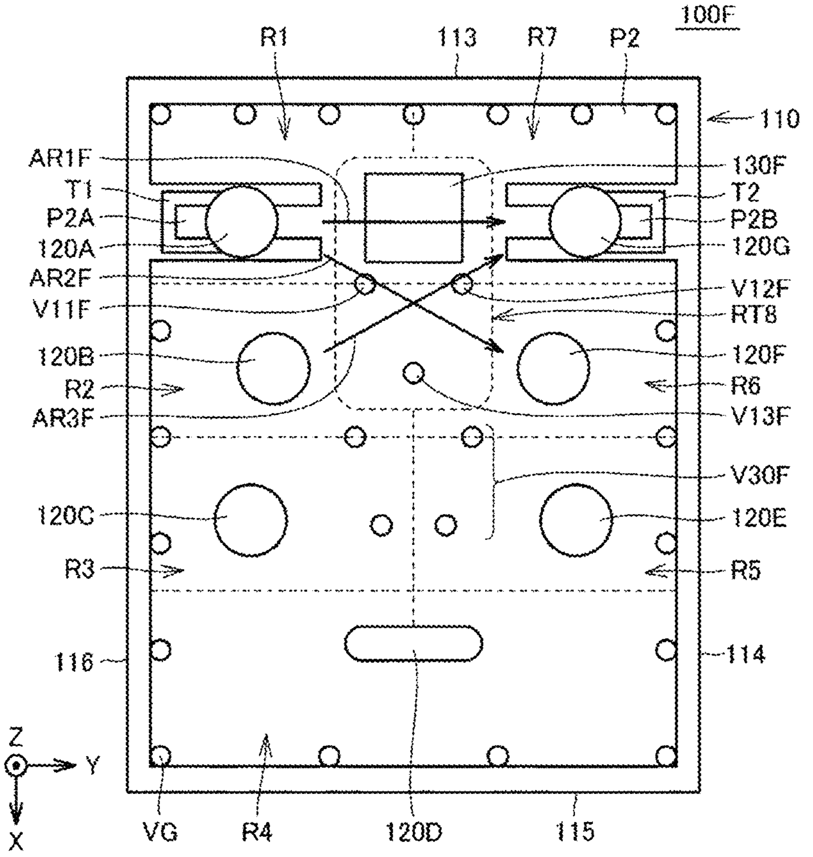
FIG. 19 is a plan view of a band pass filter of Modification 6 of a preferred embodiment of the present invention.

FIG. 19 is a plan view of a band pass filter 100F of Modification 6. In the band pass filter 100F, a trap resonator RT8 extends across the resonators R1, R2, R6, and R7, and vias V30F are provided across the resonator R3 and the resonator R5. Cross coupling of inductive coupling occurs by the vias V30F in a sub-coupling path between the resonator R3 and the resonator R5.

The trap resonator RT8 includes an inner conductor 130F and vias V11F to V13F. The inner conductor 130F extends across the resonator R1 and the resonator R7. Also, the vias V11F to V13F extend across the resonator R2 and the resonator R6. This structure causes cross coupling of relatively strong capacitive coupling to occur in a sub-coupling path between the resonator R1 and the resonator R7 (arrow AR1F). Also, cross coupling of relatively weak capacitive coupling occurs in sub-coupling paths between the resonator R1 and the resonator R6 (arrow AR2F) and between the resonator R2 and the resonator R7 (arrow AR3F) (arrow AR1F).

Therefore, in the band pass filter 100F of Modification 6, one attenuation pole occurs on the high band side with respect to the pass band, and two attenuation poles occur on the low band side.

Modification 7

Figure 20:
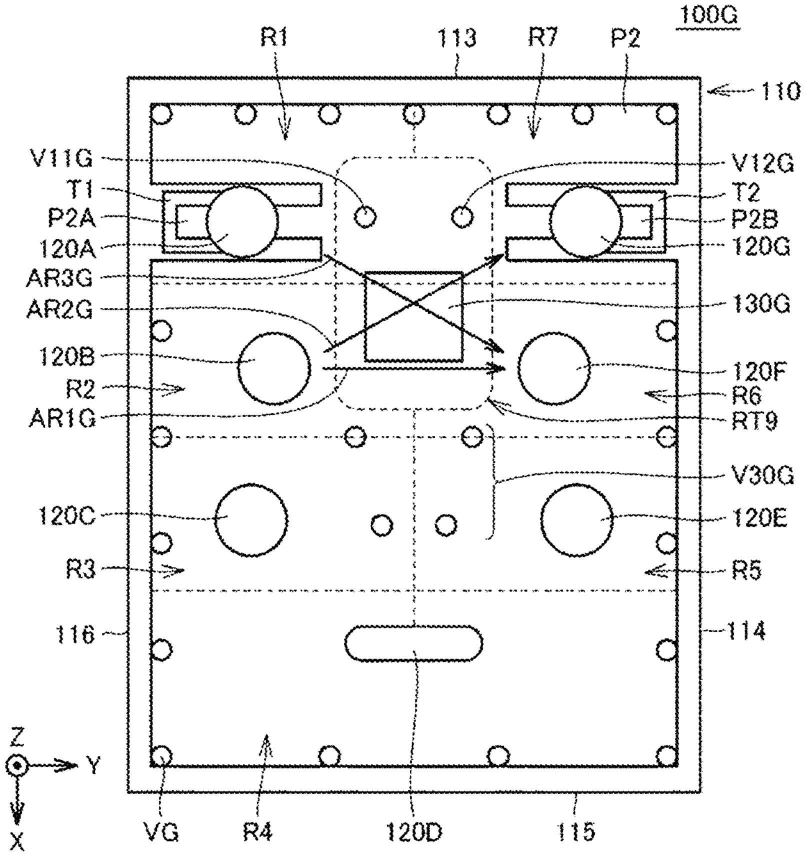
FIG. 20 is a plan view of a band pass filter of Modification 7 of a preferred embodiment of the present invention.

FIG. 20 is a plan view of a band pass filter 100G of Modification 7. In the band pass filter 100G, the structure is such that the trap resonator RT8 and the vias V30F in the band pass filter 100F of Modification 6 of FIG. 19 are replaced by a trap resonator RT9 and vias V30G.

With reference to FIG. 20, the vias V30G have a structure similar to that of the vias V30F of FIG. 19, and extend across the resonator R3 and the resonator R5. This can cause cross coupling of inductive coupling to occur in a sub-coupling path between the resonator R3 and the resonator R5.

The trap resonator RT9 includes an inner conductor 130G and vias V11G and V12G. The inner conductor 130G is located near boundaries of four resonators R1, R2, R6, and R7. Also, the vias V11G and V12G are between the inner conductor 120A of the resonator R1 and the inner conductor 120G of the resonator R7 along the Y axis.

This arrangement causes cross coupling of inductive coupling to occur in a sub-coupling path between the resonator R1 and the resonator R7. Also, cross coupling of relatively strong capacitive coupling occurs in sub-coupling paths between the resonator R2 and the resonator R6 (arrow AR1G), between the resonator R2 and the resonator R7 (arrow AR2G), and between the resonator R1 and the resonator R6 (arrow AR3G).

Therefore, in the band pass filter 100G of Modification 7, three attenuation poles occur on the high band side with respect to the pass band.

As described above, in the band pass filter configured of the plurality of dielectric waveguide resonators, waveguide resonators in two pairs included in the plurality of waveguide resonators are coupled together by the trap resonator as jumping over a portion of the principal coupling path. This causes two or more attenuation poles to occur in a non-pass band on the low band side and/or the high band side with respect to the pass band, without increasing the number of stages of dielectric waveguide resonators. Here, the arrangement of the inner conductor and the vias included in the trap resonator is changed to adjust the degree of capacitive coupling and adjust the frequencies at which attenuation poles occur. Thus, desired attenuation characteristics can be achieved. Therefore, it is possible to improve attenuation characteristics in the non-pass band in the band pass filter while reducing or preventing an increase in size of the device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A band pass filter comprising:
- a dielectric substrate including a first surface and a second surface opposed to each other and side surfaces coupling an outer edge of the first surface and an outer edge of the second surface together;
- an input terminal and an output terminal;
- a first conductor plate and a second conductor plate inside the dielectric substrate and opposed to each other;
- a first connection conductor between the first conductor plate and the second conductor plate to connect the first conductor plate and the second conductor plate together;
- a plurality of waveguide resonators coupled in series in a space between the first conductor plate and the second conductor plate along a principal coupling path from the input terminal to the output terminal; and
- a trap resonator; wherein
- in the plurality of waveguide resonators, waveguide resonators adjacent along the principal coupling path are inductively coupled;
- waveguide resonators in two pairs included in the plurality of waveguide resonators are coupled together by the trap resonator as jumping over a portion of the principal coupling path; and
- the trap resonator capacitively couples the waveguide resonators included in each of the two pairs.

2. The band pass filter according to claim 1, wherein the trap resonator includes:
- a first inner conductor extending in a direction from the first conductor plate toward the second conductor plate and not electrically connected to any of the first conductor plate and the second conductor plate; and
- at least one second connection conductor connecting the first conductor plate and the second conductor plate together.

3. The band pass filter according to claim 2, wherein each of the plurality of waveguide resonators includes a second inner conductor extending in the direction from the first conductor plate toward the second conductor plate and not electrically connected to any of the first conductor plate and the second conductor plate.

4. The band pass filter according to claim 3, wherein
- a number of the plurality of waveguide resonators is an odd number;
- the plurality of waveguide resonators are axisymmetrically folded with a center resonator positioned at a center along the principal coupling path taken as a folding point; and
- the second inner conductor in the center resonator includes:
  - a first wiring conductor and a second wiring conductor between the first conductor plate and the second conductor plate and opposed to each other on different layers of the dielectric substrate; and
  - a first columnar conductor and a second columnar conductor connected in parallel between the first wiring conductor and the second wiring conductor.

5. The band pass filter according to claim 2, wherein a relative position of the first inner conductor and the at least one second connection conductor determine a degree of capacitive coupling.

6. The band pass filter according to claim 1, wherein
- the plurality of waveguide resonators include a first resonator, a second resonator, a third resonator, a fourth resonator, and a fifth resonator coupled in series along the principal coupling path;
- the plurality of waveguide resonators are axisymmetrically folded with the third resonator taken as a folding point; and
- the first resonator and the fourth resonator, and the second resonator and the fifth resonator, are capacitively coupled via the trap resonator.

7. The band pass filter according to claim 6, wherein
- the second resonator and the fourth resonator are capacitively coupled via the trap resonator; and
- a capacitive coupling between the second resonator and the fourth resonator has a degree of coupling stronger than degrees of coupling of capacitive coupling between the first resonator and the fourth resonator and between the second resonator and the fifth resonator.

8. The band pass filter according to claim 7, wherein
- the first resonator and the fifth resonator, and the second resonator and the fourth resonator are capacitively coupled via the trap resonator; and
- a capacitive coupling between the first resonator and the fifth resonator has a degree of coupling stronger than a degree of coupling of capacitive coupling between the second resonator and the fourth resonator.

9. The band pass filter according to claim 1, wherein the band pass filter is a dielectric waveguide filter.

10. The band pass filter according to claim 1, further comprising a ground electrode adjacent to a dielectric layer of the dielectric substrate on which the second conductor plate is provided.

11. The band pass filter according to claim 10, wherein the second conductor plate includes a notch along each of two longer sides thereof.

12. The band pass filter according to claim 10, wherein the ground electrode includes a notch along each of two longer sides thereof.

13. The band pass filter according to claim 1, further comprising a plurality of ground vias located along the side surfaces of the dielectric substrate.

14. The band pass filter according to claim 1, further comprising a plurality of vias connecting the first conductor plate and the second conductor plate and a ground plate.

15. The band pass filter according to claim 1, further comprising a plurality of flat-plate-shaped electrodes connecting the first conductor plate and the second conductor plate and a ground plate.

16. The band pass filter according to claim 1, wherein the plurality of waveguide resonators use a TE101 mode.

17. The band pass filter according to claim 1, wherein two or more attenuation poles occur in a non-pass band on a low band side and/or a high band side with respect to the pass band.

18. A high frequency front-end circuit comprising:

the band pass filter according to claim 1.

19. A communication device comprising the high frequency front-end circuit of claim 18.

20. The communication device according to claim 19, wherein the communication device is a cellular phone base station.

* * * * *